United States Patent
Park et al.

(10) Patent No.: US 12,429,465 B2
(45) Date of Patent: Sep. 30, 2025

(54) MULTI-COLUMN FOR ISOLATING EXOSOMES AND EXOSOME ISOLATION METHOD

(71) Applicants: Korea University Research and Business Foundation, Seoul (KR); Korea Advanced Institute of Science and Technology, Daejeon (KR)

(72) Inventors: Yong Park, Seoul (KR); Yeon Ho Choi, Seoul (KR); Sung Hoi Hong, Seoul (KR); Hyun Koo Kim, Seoul (KR); Ji Ho Park, Daejeon (KR); Jik Han Jung, Icheon (KR)

(73) Assignees: KOREA UNIVERSITY RESEARCH AND BUSINESS FOUNDATION, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 1442 days.

(21) Appl. No.: 16/971,108

(22) PCT Filed: Feb. 20, 2019

(86) PCT No.: PCT/KR2019/002008
§ 371 (c)(1),
(2) Date: Aug. 19, 2020

(87) PCT Pub. No.: WO2019/164227
PCT Pub. Date: Aug. 29, 2019

(65) Prior Publication Data
US 2020/0378932 A1    Dec. 3, 2020

(30) Foreign Application Priority Data

Feb. 20, 2018  (KR) .................. 10-2018-0019894
Feb. 18, 2019  (KR) .................. 10-2019-0018605

(51) Int. Cl.
*G01N 30/80*  (2006.01)
*G01N 30/02*  (2006.01)

(52) U.S. Cl.
CPC ....... *G01N 30/80* (2013.01); *G01N 2030/027* (2013.01)

(58) Field of Classification Search
CPC ............ G01N 30/80; G01N 2030/027; G01N 2030/8831; G01N 30/6039; B01J 2220/54;
(Continued)

(56) References Cited

U.S. PATENT DOCUMENTS

2008/0033158 A1\* 2/2008 Ngo ................... C12N 15/101
                                                536/25.4

FOREIGN PATENT DOCUMENTS

CN    1355704 A    6/2002
CN    102154228 A    8/2011
(Continued)

OTHER PUBLICATIONS

Translation of KR 10-2016-0133812 (Year: 2016).\*
(Continued)

*Primary Examiner* — Samuel P Siefke
(74) *Attorney, Agent, or Firm* — Armstrong Teasdale LLP (57) ABSTRACT

The present invention relates to a multi-column for isolating exosomes and an exosome isolation method, for isolating exosomes from a biological sample containing exosomes mixed with impurities such as lipoproteins and water-soluble proteins.

7 Claims, 12 Drawing Sheets

(58) Field of Classification Search
CPC ............... B01J 20/28052; B01J 20/285; B01J 20/28083; B01J 20/28085; B01J 20/283; B01D 15/34; B01D 15/1871; B01D 15/22
See application file for complete search history.

(56) References Cited

FOREIGN PATENT DOCUMENTS

| | | | |
|---|---|---|---|
| CN | 106103477 | A | 11/2016 |
| JP | 2016-193896 | A | 11/2016 |
| KR | 10-2013-0068530 | A | 6/2013 |
| KR | 10-2014-0050465 | A | 4/2014 |
| KR | 10-2016-0115988 | A | 10/2016 |
| KR | 10-2016-0133812 | A | 11/2016 |
| KR | 10-2017-0028432 | A | 3/2017 |
| KR | 10-2017-0048188 | A | 5/2017 |
| KR | 10-2018-0006923 | A | 1/2018 |
| KR | 10-2018-0126365 | A | 11/2018 |
| WO | 2010/075116 | A2 | 7/2010 |
| WO | 2010/138337 | A1 | 12/2010 |
| WO | 2010/075116 | A3 | 4/2011 |
| WO | 2017/139553 | A1 | 8/2017 |

OTHER PUBLICATIONS

Welton et al. (2015) "Ready-made chromatography colummns for extracellular vesicle isolation from plasma", Journal of Extracellular Vesicles, 4:1, DOI: 10.3402/jev.v4.27269.
Hong et al. (2016) "Isolation of biologically active and morphologically intact exosomes from plasma of patients with cancer", Journal of Extracellular Vesicles, 5:1, DOI: 10.3402/jev.v5.29289.
Taylor and Shah (2015) "Methods of isolating extracellular vesicles impact down-stream analyses of their cargoes", Methods, 87:3-10.
International Search Report corresponding to PCT/KR2019/002008 dated May 30, 2019 (4 pages).
Kang et al. (Mar. 1, 2017) "Methods to isolate extracellular vesicles for diagnosis", Micro and Nano Systems Letters, Biomed Central Ltd., London, UK, vol. 5:15 (pp. 1-11).
Bõing, et al. (Jan. 1, 2014) "Single-step isolation of extracellular vesicles by size-exclusion chromatography", Journal of Extracellular Vesicles, vol. 3:1, 23430 (12 pages).
Supplementary European Search Report corresponding to European Application No. 19758236.4 dated Nov. 4, 2021 (8 pages).
Advances of exosome research in cancer radiotherapy and chemotherapy (Dec. 10, 2021) (English abstract). DOI: 10.11889/j.1000-3436.2017.rrj.35.030102 (7 pages).

* cited by examiner

MULTI-COLUMN FOR ISOLATING EXOSOMES AND EXOSOME ISOLATION METHOD

RELATED APPLICATIONS

This application is a U.S. national stage application filed under 35 U.S.C. § 371 of PCT/KR2019/00208 filed Feb. 20, 2019, designating the United States, which claims the benefit of and priority to Korean Patent Application No. 10-2019-0018605 filed Feb. 18, 2019 and Korean Patent Application No. 10-2018-0019894 filed Feb. 20, 2018. The entire contents of the aforementioned patent applications are incorporated herein by this reference.

TECHNICAL FIELD

The present invention relates to a multi-column for isolating exosomes with high purity from a biological sample in which various biomolecules and exosomes are mixed, and an exosome isolation method.

BACKGROUND ART

Extracellular vesicles have a concept including exosomes, ectosomes, microvesicles and apoptotic bodies that are released or secreted from cells. Exosomes are biological nanoparticles that have a size of 20 nanometers (nm) to 150 nm and that are generated from multivesicular bodies (MVBs).

Such extracellular vesicles may be relatively easily separated from various types of biofluids such as blood, lymphatic fluids, cerebrospinal fluids, urine, amniotic fluids, breast milk, saliva, and semen, and are called dexosomes (from dendritic cells), oncosomes (from cancer cells), prostasomes (from prostate cells), cardiosomes (from cardiomyocytes), and the like, based on cells from which the extracellular vesicles are derived. Cell vesicles contain various nucleotides or labeled proteins depending on cells from which the vesicles are derived, or organelle within cells. For example, oncosomes that are extracellular vesicles derived from cancer cells include mRNA of genes that induce growth of cancer cells, and extracellular vesicles derived from antigen-presenting cells include a major histocompatibilith complex. Since extracellular vesicles contain biomaterials, such as cell-specific proteins or nucleotides, which are concentrated at a high concentration, proteins or nucleotides that are difficult to detect by typical analysis methods because proteins or nucleotides are present in an amount of about 0.01% of the total protein in a general biological fluid, may be relatively easily detected from extracellular vesicles. In addition, although types of proteins or nucleotides present in extracellular vesicles correspond to only a small fraction of the whole, materials of extracellular vesicles may exhibit unique characteristics of cells from which extracellular vesicles are derived. Accordingly, an exosome analysis is very useful for the purpose of diagnosis of a specific disease, and research on exosomes has been actively conducted recently.

It is important to obtain exosomes with high purity in diagnosis and treatment methods using exosomes. Various methods including Korean Patent Publication No. 10-2016-0115988 in association with isolation of exosomes have been studied. Examples of such methods include use of an ultracentrifuge, a density centrifuge, and a column, a PEG precipitation (including use of ExoQuick™, Total Exosome Isolation™, and the like), a chromatography, an immuno-magnetic separation (IMS), an acoustic separation (acoustic purification), and the like. Recently, a column chromatography is receiving much attention in that it is possible to obtain exosomes with relatively high purity for a short period of time.

However, when exosomes are separated using a conventional column chromatography, lipoproteins may be eluted together with the exosomes. Since at least two separation steps are performed in the conventional column chromatography, a relatively long period of time may be required, or exosomes may be lost. Existing column chromatography studies focused only on an exosome elution section, and an in-depth analysis of lipoprotein elution was rarely performed. However, since lipoproteins with a size and density similar to those of exosomes are always present in a cell culture solution or blood, a lipoprotein separation is essential in exosome studies.

Against this background, the present inventors tried to develop a method of separating various impurities such as lipoproteins, water-soluble proteins, and the like, together with exosomes from a biological sample, and the inventors optimize a condition for isolating exosomes and impurities by analyzing particles in each section eluted using a column in a cell culture solution and blood, and confirm a method of obtaining pure exosomes based on the condition, to complete the present invention.

DISCLOSURE OF INVENTION

Technical Goals

Against this background, the present inventors found that an isolation efficiency of exosomes is remarkably excellent when two types of beads are stacked in a specific order and ratio, thereby completing the present invention.

Thus, an aspect of the present invention is to provide a multi-column for isolating exosomes included in a biological sample from lipoproteins and water-soluble proteins, and an exosome isolation method using the same.

However, problems to be solved in the example embodiments are not limited to the aforementioned problems, and other problems not mentioned herein can be clearly understood by those skilled in the art from the following description.

Technical Solutions

According to an example embodiment of the present invention, there is provided a multi-column for isolating exosomes, including porous beads a having a pore size of 20 nanometers (nm) to 100 nm, porous beads b stacked on the porous beads a and having a pore size of 20 nm or less, and a separation membrane disposed between the porous beads a and b, wherein the porous beads a isolate exosomes from lipoproteins in a biological sample, and the porous beads b isolate the exosomes from water-soluble proteins in the biological sample.

According to an aspect, a volume ratio between the porous beads a and b may be in a range of 95:5 to 5:95.

According to an aspect, a volume ratio between the porous beads a and b may be in a range of 5:5 to 1:9.

According to an aspect, a volume ratio between the porous beads a and b may be in a range of 3:7 to 1:9.

According to an aspect, a surface of each of the porous beads a may have a higher negative charge value than that of a surface of each of the porous beads b.

According to an aspect, the porous bead may be formed of at least one material selected from agarose, sepharose, cellulose, silica gel, dextran, N,N'-methylene bisacrylamide, methacryl, polyacrylamide, and polystyrene.

According to an aspect, the biological sample may be at least one selected from the group consisting of blood, a lymph fluid, a cerebrospinal fluid, urine, an amniotic fluid, breast milk, saliva, semen, and a cell culture fluid.

According to another example embodiment of the present invention, there is provided an exosome isolation method using a multi-column including porous beads a having a pore size of 20 nm to 100 nm, porous beads b stacked on the porous beads a and having a pore size of 20 nm or less, and a separation membrane disposed between the porous beads a and b, the exosome isolation method including isolating exosomes and water-soluble proteins by passing a biological sample containing the exosomes through the porous beads b; and isolating the exosomes and lipoproteins by passing the biological sample that has passed through the porous beads b through the porous beads a.

Effects

A multi-column for isolating exosomes and an exosome isolation method using the multi-column according to the present invention may increase purity of isolated exosomes by greatly reducing an amount of impurities such as lipoproteins, water-soluble proteins, and the like, included in a biological sample.

In particular, when a size-exclusion chromatography (SEC) is performed using a multi-column of the present invention, the multi-column may be useful for isolating exosomes from a sample because an isolation efficiency for exosomes is excellent in comparison to lipoproteins.

The effects obtainable through the following example embodiments are not limited to the aforementioned effects, and should be understood to include all effects that may be inferred from the detailed description for carrying out the invention or from the configuration of the invention described in the claims.

BRIEF DESCRIPTION OF DRAWINGS

FIGS. 2A and 2B relate to results of isolation of exosomes using a conventional single column and a multi-column according to the present invention (2B: 2B single column, Dual column: the multi-column of the present invention)

FIGS. 3A through 3C illustrate results of detection of exosomes and lipoproteins in an actual fractionation of serum samples separated using a multi-column of the present invention (ApoB: lipoprotein, CD63: exosome marker protein, and 9-15: column fraction numbers #9 to #15).

FIGS. 4A through 4C illustrate results of detection of exosomes and lipoproteins for each fractionation of serum samples separated using a conventional single column and using a multi-column of the present invention (serum: serum not treated separately, Marker: standard marker for checking a molecular weight, ExoQuick: ExoQuick isolation method, 2B column: 2B single column, and Dual column: the multi-column of the present invention).

DETAILED DESCRIPTION FOR CARRYING OUT THE INVENTION

Hereinafter, example embodiments will be described in detail with reference to the accompanying drawings. Unless otherwise stated, the same elements will be designated by the same reference numerals.

Various modifications may be made to the following example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

In addition, when describing the example embodiments with reference to the accompanying drawings, like reference numerals refer to like elements and a repeated description related thereto will be omitted. In the description of example embodiments, detailed description of well-known related structures or functions will be omitted when it is deemed that such description will cause ambiguous interpretation of the example embodiments.

The term "exosome" used herein refers to a cell-derived vesicle with a diameter of 20 nanometers (nm) to 150 nm secreted from many types of cells including cell cultures, and exosomes are known to perform various functions, for example, a function of delivering membrane components, proteins, or RNA.

According to an example embodiment of the present invention, a multi-column for isolating exosomes may include porous beads a having a pore size of 20 nm to 100 nm, porous beads b stacked on the porous beads a and having a pore size of 20 nm or less, and a separation membrane disposed between the porous beads a and b. The porous beads a may isolate exosomes from lipoproteins in a biological sample, and the porous beads b may isolate the exosomes from water-soluble proteins in the biological sample.

The porous beads a may be used to isolate exosomes from lipoproteins in a biological sample and may isolate molecules having a size of 10 MDa or less. The porous beads b may be used to isolate exosomes from water-soluble proteins in the biological sample and may isolate molecules having a size of 500 kDa or less. Each bead may desirably have negative charges. Also, for faster elution of lipoproteins first reaching a lower portion of a column under an influence of charges, the porous beads a stacked in the lower portion may desirably have a lower average surface charge than that of the porous beads b stacked in an upper portion (refer to Example 5).

The separation membranes may be disposed between the porous beads a and b to prevent different types of beads from being mixed when a column container is consecutively packed with various types of beads. The separation membranes may be formed of, but is not limited to, resins, for example, polyethylene or polypropylene.

Porous beads packed in the multi-column of the present invention may include, but are not limited to, for example, at least one material selected from agarose, sepharose, cellulose, silica gel, dextran, N, N'-methylene bisacrylamide, methacryl, polyacrylamide, and polystyrene.

The porous beads may include, for example, Sepharose 2B, 4B, 6B, CL-2B, CL-4B, and CL-6B; Sephacryl S-200 HR, S-300 HR, S-400 HR and S-500 HR; and Toyopearl HW-55, HW-65 and HW-75, and Superdex75, and may desirably be Sepharose CL-6B and Sephacryl 200-HR.

The porous beads a and b may be packed in a volume ratio of 95:5 to 5:95, desirably a volume ratio of 5:5 to 1:9, and more desirably a volume ratio of 3:7 to 1:9.

For example, when a size-exclusion chromatography (SEC) is performed using a multi-column manufactured by packing two types of beads that are different from each other in a pore size and a surface negative charge value at a specific volume ratio, as described above, exosomes may be isolated with high purity based on a difference in an elution rate among lipoproteins, exosomes, and water-soluble proteins.

The biological sample containing the exosomes may be, but is not limited to, for example, at least one selected from the group consisting of blood, a lymph fluid, a cerebrospinal fluid, urine, an amniotic fluid, breast milk, saliva, semen, and a cell culture fluid.

Exosomes may be included in a proportion of 20% to 80% of the total eluate after the chromatography, but are not limited thereto. Based on an exosome isolation method of the present invention, a proportion of exosomes with respect to lipoproteins in a section of 29% to 57% may be high.

According to another example embodiment of the present invention, an exosome isolation method using a multi-column that includes porous beads a having a pore size of 20 nm to 100 nm, porous beads b stacked on the porous beads a and having a pore size of 20 nm or less, and a separation membrane disposed between the porous beads a and b, may include isolating exosomes and water-soluble proteins by passing a biological sample containing the exosomes through the porous beads b; and isolating the exosomes and lipoproteins by passing the biological sample that has passed through the porous beads b through the porous beads a.

Description of the multi-column used in the exosome isolation method is the same as the above description.

Figure 1:
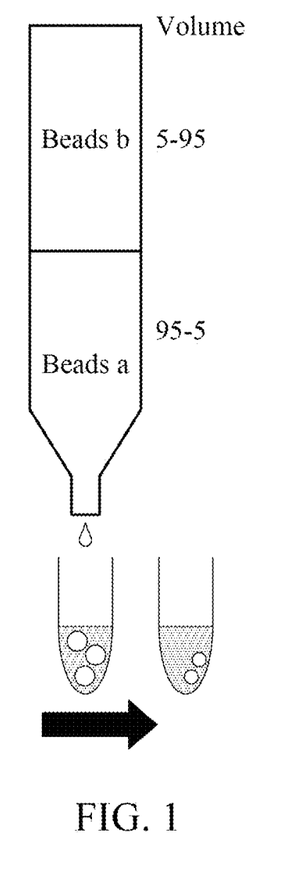
FIG. 1 schematically illustrates a multi-column according to an example embodiment of the present invention.
Figure 3A:
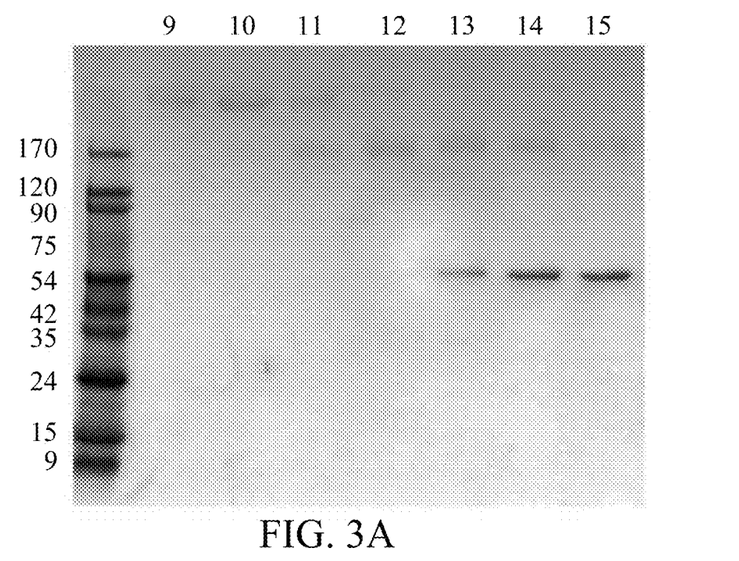
FIG. 3A: SDS-PAGE
Figure 3B:
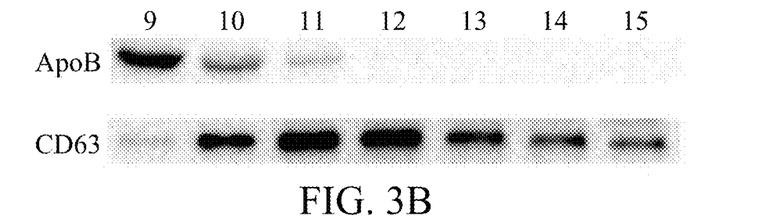
FIG. 3B: Western blot
Figure 3C:
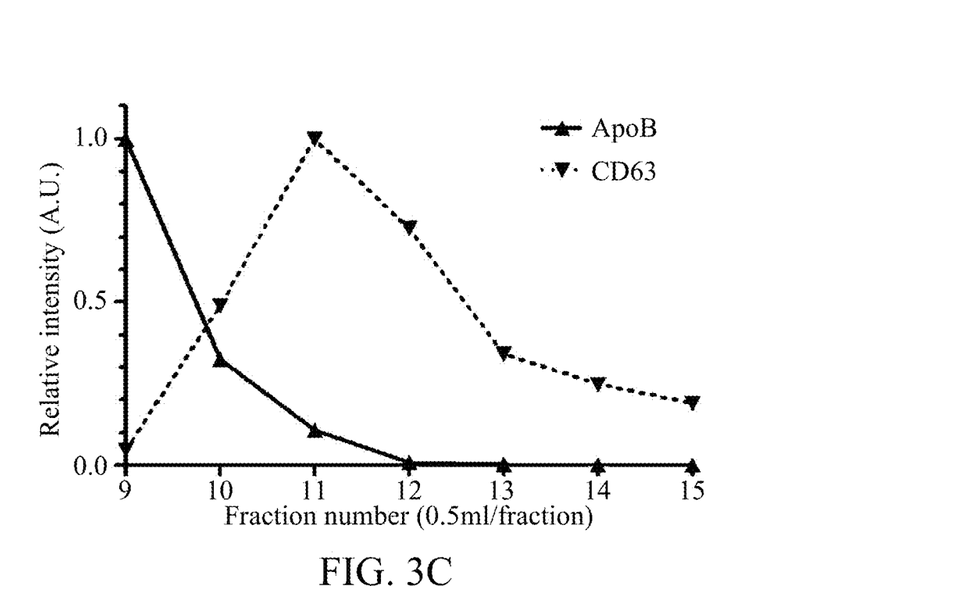
FIG. 3C: Relative detection intensity of lipoproteins and exosomes

In an example embodiment of the present invention, exosomes in multi-column fractions as shown in FIG. 1 were shown in sections 9 to 15. In particular, in sections 10 to 12, a relatively large amount of exosomes are included in comparison to lipoproteins and water-soluble proteins (FIG. 3). When the multi-column is used, an exosome fraction with remarkably high purity may be obtained in comparison to a single column at a protein yield comparable to a conventional single column and a fractionation method using a PEG precipitation. Thus, the multi-column may be useful for isolating exosomes.

Hereinafter, the present invention will be described in more detail by examples. However, the following examples and experimental example are given for the purpose of illustrating the present invention, and the present invention is not limited by the examples and experimental example.

EXAMPLE 1: FABRICATION OF MULTI-COLUMN

A lower portion and an upper portion of a chromatography column (diameter: 10 mm, height: 50 mm) were packed with 70% (v/v) Sepharose CL-6B and 30% (v/v) Sephacryl 200-HR, respectively, to fabricate a multi-column so that a height ratio between the lower portion and the upper portion was 7:3. Here, the Sepharose CL-6B and the Sephacryl 200-HR have average surface charge values of −30 and −7, respectively.

EXAMPLE 2: CONFIRMATION OF EXOSOME ISOLATION CAPABILITY UNDER EXISTING COLUMN CONDITION

A chromatography column (diameter: 10 mm, height: 50 mm) packed with beads was used, and a serum that is a supernatant obtained by centrifuging blood at 10000 rcf and 4° C. for 30 minutes was used as a sample. To confirm material separation effects by the existing single column and the multi-column, a size exclusion chromatography (SEC) was performed on the sample.

Figure 2A:
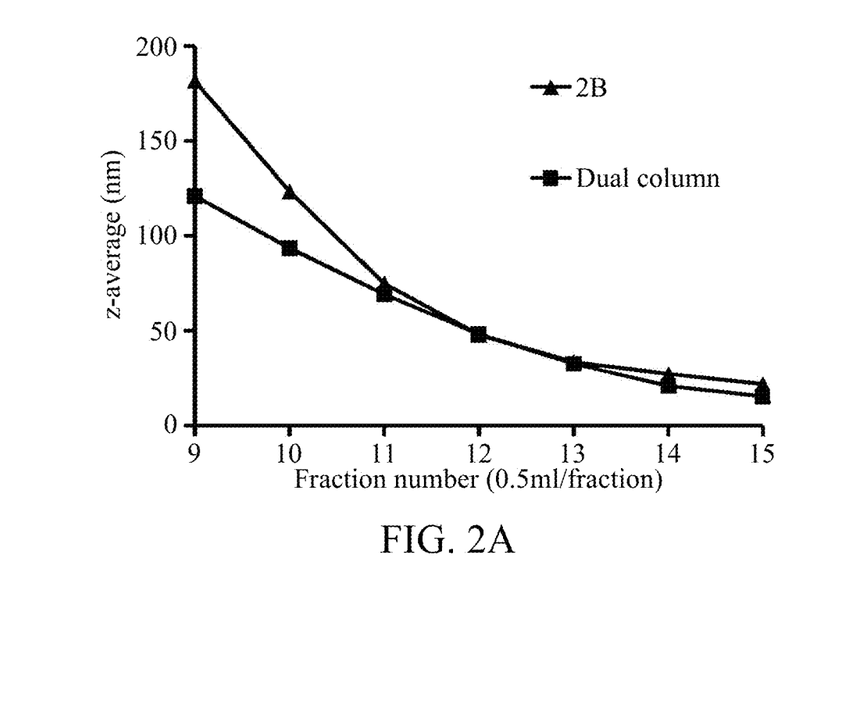
FIG. 2A illustrates an absorbance of fractionated samples for each column.
Figure 2B:
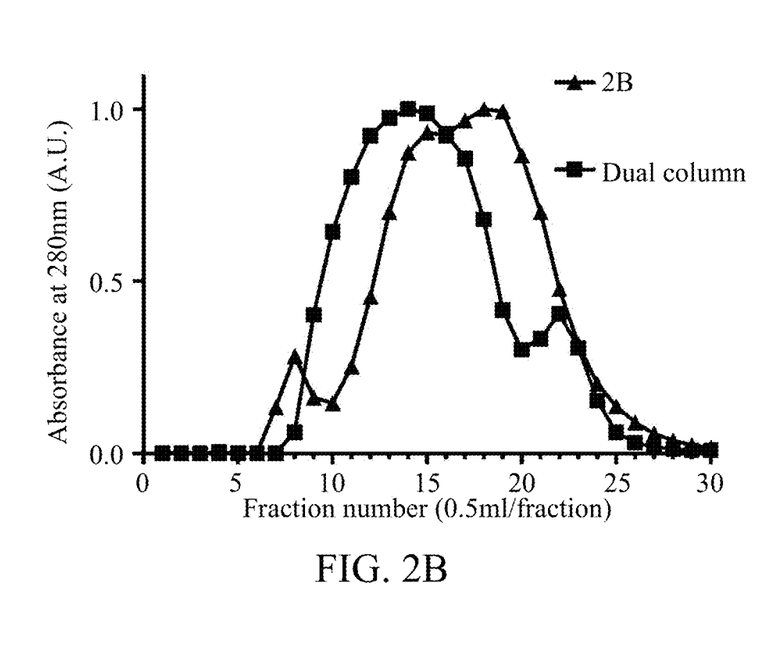
FIG. 2B illustrates a z-average size of particles in fractionated samples for each column verified through dynamic light scattering (DLS).

Specifically, Sepharose CL-2B was used as beads packed in a single column (2B), and the multi-column fabricated in Example 1 was used as a multi-column (Dual column). Prior to loading of the sample, the packed beads were washed with 300 ml of PBS. The prepared sample was loaded immediately when a mobile phase buffer was exhausted other than the packed beads. A volume of the sample loaded in a column was not allowed to exceed 5% of the total volume of the packed beads, and accordingly 0.3 to 0.5 ml of the sample was loaded in the column. Pressure of 2 to 4 Pa was applied to a mobile phase. A solution section where 0.5 ml of eluate flows out from a point in time at which the sample was loaded was defined as one section. An absorbance of the collected eluate at 280 nm was confirmed, a Z-average size was measured using dynamic light scattering (DLS), and the absorbance and the Z-average size are shown in FIG. 2. All samples were eluted within sections 25 to 30.

As a result, it is found that it was not easy to identify exosomes, lipoproteins and water-soluble proteins in fractions in the absorbance (FIG. 2A) and DLS analysis (FIG. 2B).

EXAMPLE 3: COMPARISON OF TENDENCY OF ELUTION BETWEEN EXOSOMES AND LIPOPROTEINS IN SERUM

For comparison of elution of exosomes, lipoproteins and water-soluble proteins in serum samples for each section, fractionation was performed using the multi-column of Example 1 by a method described in Example 2, and SDS-PAGE and western blot were performed for each fractionation. An antibody (sc-15363 manufactured by Santa Cruz) against CD63 that is an exosome marker protein, as a primary antibody, was diluted at 1:500, ApoB-100 antibody (sc-25542 manufactured by Santa Cruz) as a lipoprotein antibody was diluted at 1:1000, and then whether elution was performed was determined based on the diluted antibodies.

As a result, albumin (~65 kDa), a water-soluble protein, was detected from section #13 (FIG. 3A), and lipoproteins were shown most clearly in section #9 and detected up to section #11. Exosomes were detected in a small amount in section #9 and appeared darkest in sections #11 and #12, and then the amount of exosomes detected gradually decreased (FIG. 3B). When an amount of lipoproteins and an amount of exosomes in fractions are relatively compared for each of the sections #9 to #15, lipoproteins mainly appeared in the section 9 #9, but the amount of exosomes detected was greater than that of lipoproteins in the section 10 #10, a largest amount of exosomes appeared in the section 11 #11, lipoproteins were hardly detected in the fractions in the section 12 #12, and water-soluble proteins were detected from section 13 #13. Thus, the sections 10 to 12 #10 to #12 were confirmed to be more suitable to obtain exosomes (FIG. 3C).

EXAMPLE 4: CONFIRMATION OF ISOLATION EFFICIENCY OF EXOSOMES AND LIPOPROTEINS BASED ON ISOLATION METHOD AND COLUMN

Figure 4A:
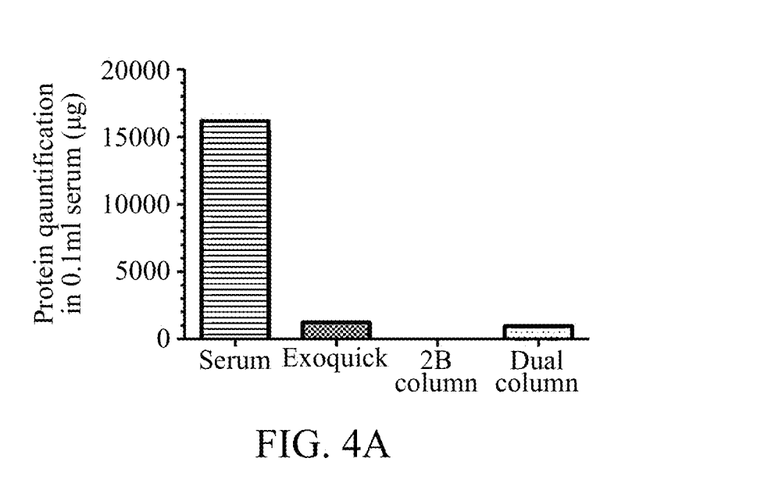
FIG. 4A: Total protein quantification result in fractions
Figure 4B:
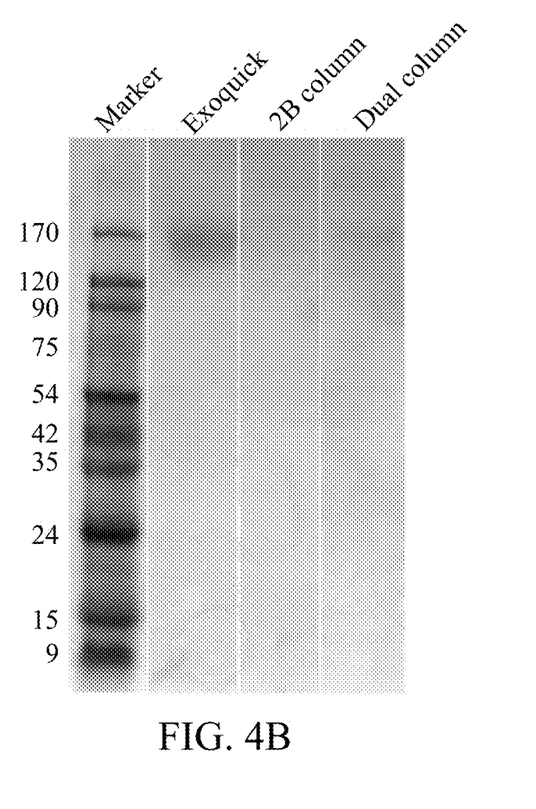
FIG. 4B: SDS-PAGE
Figure 4C:
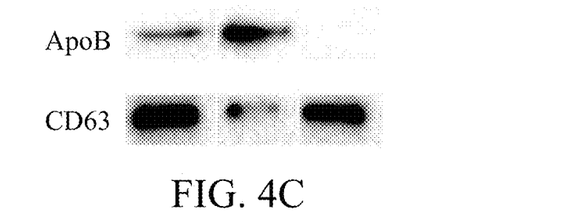
FIG. 4C: Western blot

Fractions of exosomes and lipoproteins isolated by performing each of a precipitation method (Exoquick) using centrifugation, an SEC using the existing single column (2B column), and an SEC using the multi-column (Dual column) of the present invention with respect to the serum sample of Example 2, are shown in FIG. 4.

Specifically, the precipitation method was performed through centrifugation and addition of commercialized product ExoQuick™ (System Biosciences, Inc.). A column packed with Sepharose CL-2B was used as the existing single column, and the multi-column of Example 1 was used as a multi-column. The total amount of proteins in the sample that was not fractionated, and the total amount of proteins in the sample that was fractionated were quantified, and a difference between the amounts of exosomes and lipoproteins that were detected and relative amounts of exosomes and lipoproteins was determined using SDS-PAGE and western blot. Similarly to Example 3, an antibody against CD63 that is an exosome marker protein, and an antibody against ApoB that is a lipoprotein marker protein were used, and CD63 density (%)/ApoB density (%) was calculated by densitometry of a sample portion blotted using Bio-Rad ChemiDoc image software.

As a result, the total amount of proteins contained in the fractionated sample is shown to be the smallest amount in the case of using the 2B column (FIG. 4A), and a large amount of lipoproteins is shown in the case of using Exoquick (FIG. 4B).

Figure 5:
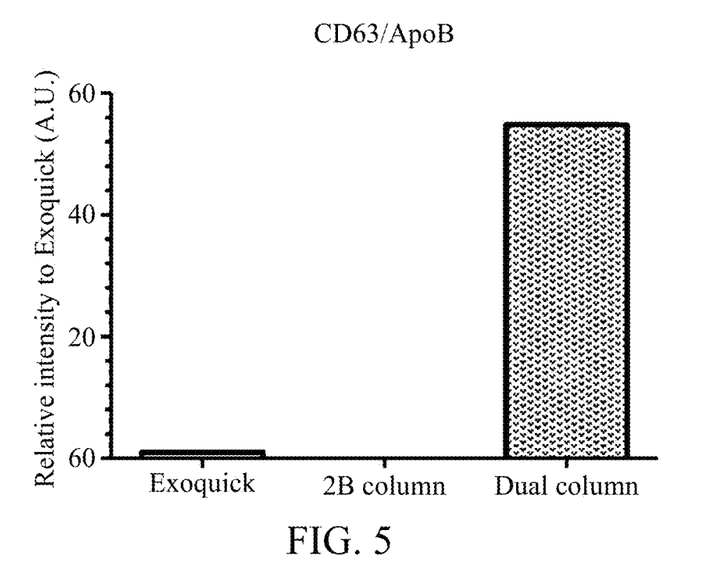
FIG. 5 illustrates a comparison of a relative ratio of exosomes with respect to lipoproteins in fractions between serum samples separated using a conventional single column and using a multi-column of the present invention (ExoQuick: ExoQuick isolation method, 2B column: 2B single column, and Dual column: the multi-column of the present invention).

However, in western blot results, it may be confirmed that in a fraction obtained using the 2B column, a smallest amount of exosomes and a large amount of lipoproteins were detected. On the other hand, in an experimental group using the multi-column (Dual column) of Example 1, lipoproteins were hardly detected (FIG. 4C). In particular, in results of the CD63 density (%)/ApoB density (%) showing the isolation efficiency of exosomes and lipoproteins, the highest value is shown in the case of using the multi-column of Example 1 (FIG. 5).

In other words, the multi-column of the present invention has an excellent capability of isolating only exosomes by removing lipoproteins from the sample, in comparison to the existing single column.

EXAMPLE 5: EVALUATION OF ISOLATION EFFICIENCY BASED ON STACKING ORDER OF BEADS

To evaluate the isolation efficiency based on a stacking order of beads packed in a multi-column, a multi-column (A) of Example 1, and a multi-column (B) that is a chromatography column (diameter: 10 mm, height: 50 mm), in which 70% (v/v) Sephacryl 200-HR and 30% (v/v) Sepharose CL-6B were stacked in a lower portion and an upper portion thereof, respectively, were prepared.

Figure 6A:
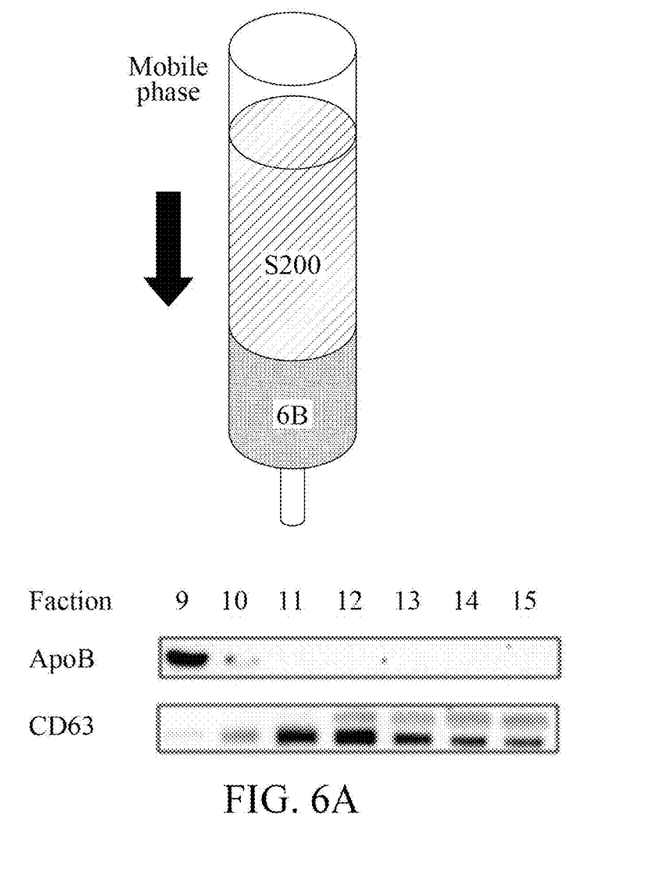
FIGS. 6A and 6B illustrate results of detection of exosomes and lipoproteins using multi-columns in which Sepharose CL-6B and Sephacryl 200-HR are stacked in different orders.
Figure 6B:
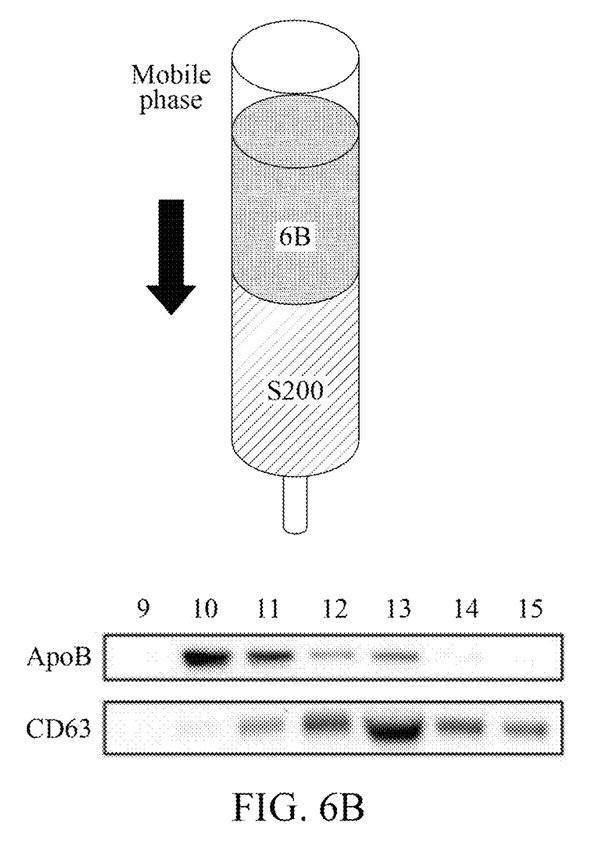

An SEC was performed by the method of Example 2 using the prepared multi-columns, and the amounts of lipoproteins and exosomes detected were confirmed for each elution section and shown in FIGS. 6A and 6B (FIG. 6A: the multi-column (A), and FIG. 6B: the multi-column (B)). As a result, it was found that lipoproteins were hardly detected in the case of the multi-column (A) of Example 1, whereas lipoproteins were detected in most elution sections in the case of the multi-column (B), and that a relatively large amount of exosomes was detected in the case of the multi-column (A).

EXAMPLE 6: EVALUATION OF ISOLATION EFFICIENCY BASED ON VOLUME RATIO OF BEADS

To evaluate the isolation efficiency based on a volume ratio of beads packed in a multi-column, a multi-column in which Sepharose CL-6B and Sephacryl 200-HR are stacked in volume ratios of 9:1, 7:3, 5:5, 3:7, and 1:9 sequentially from the bottom of the chromatography column (diameter: 10 mm, height: 50 mm), a single column with Sepharose CL-6B, and a single column with Sephacryl 200-HR were prepared.

Figure 7:
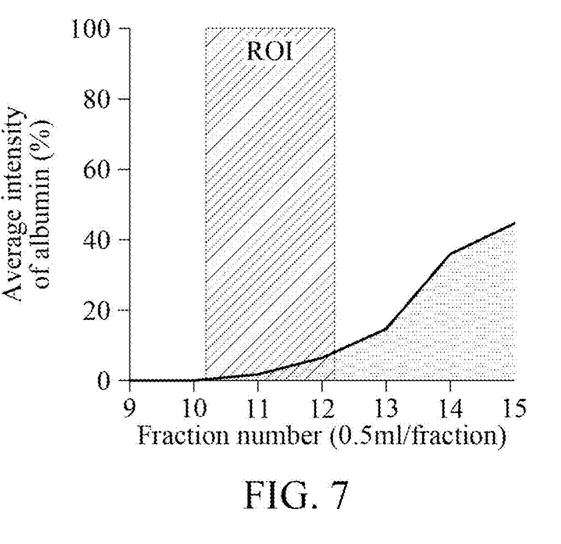
FIG. 7 illustrates an amount of albumin, a water-soluble protein, detected in fractionation of a serum sample.

An SEC was performed using the prepared columns by the method of Example 2. As a result, water-soluble proteins passing through all two types of beads due to their low molecular weight were eluted after section 13 regardless of a volume ratio of packed beads (FIG. 7), and accordingly the amounts of lipoproteins and exosomes detected were analyzed by setting sections 11 and 12 as Regions of interest (ROIs) and shown in FIGS. 8 through 10.

Figure 8:
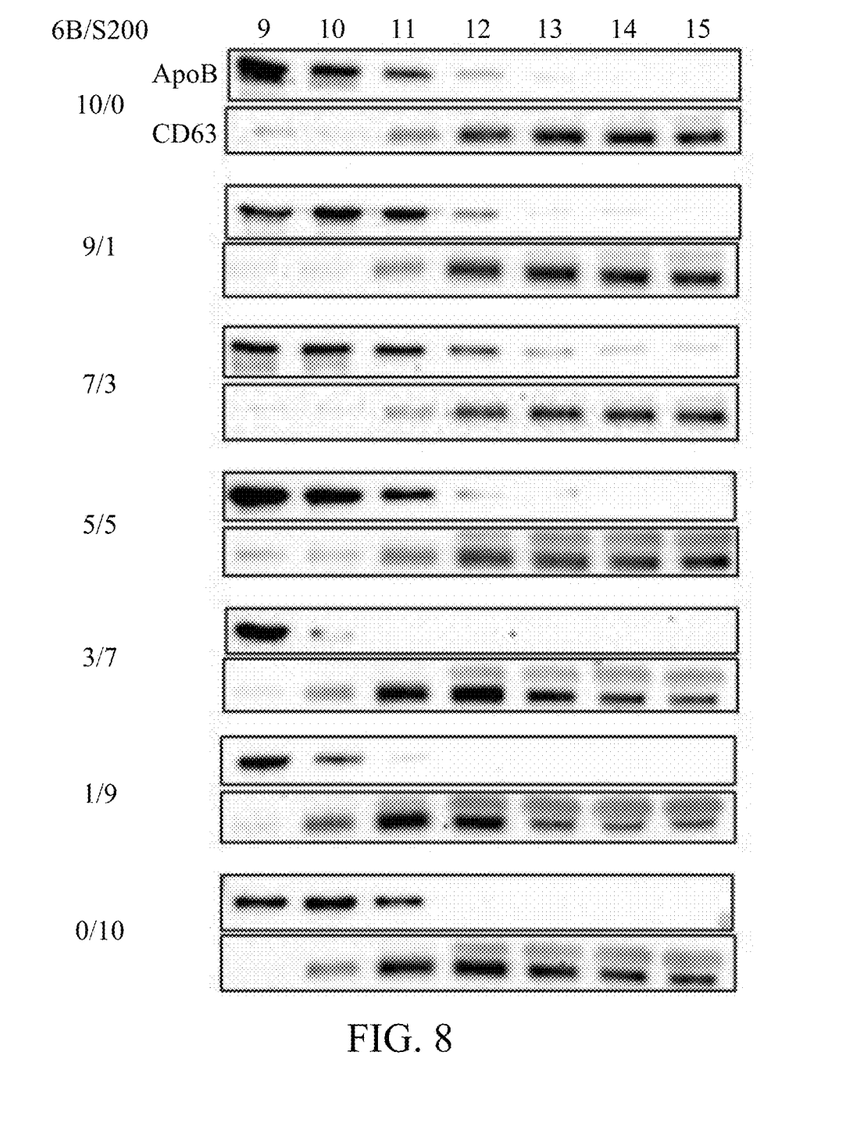
FIG. 8 illustrates results of detection of exosomes and lipoproteins using multi-columns manufactured with different volume ratios between Sepharose CL-6B and Sephacryl 200-HR.
Figure 9:
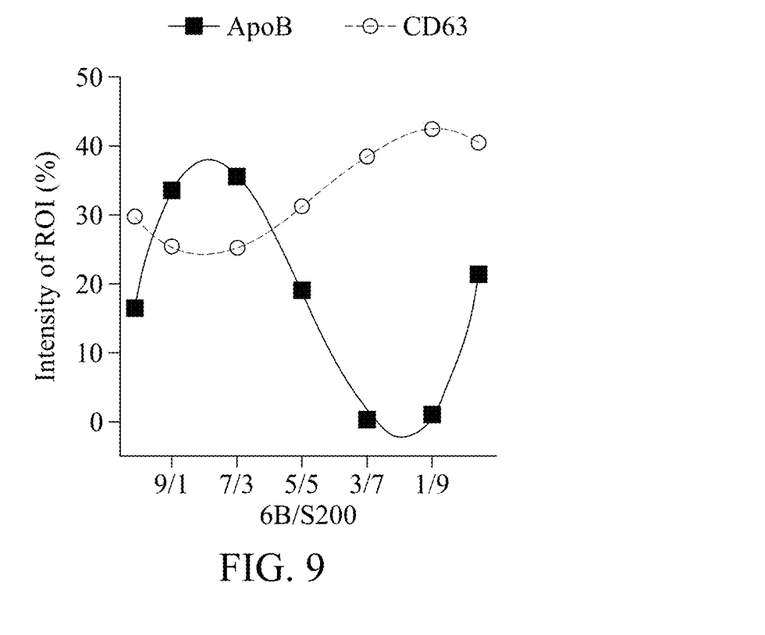
FIG. 9 illustrates amounts of exosomes and lipoproteins detected in fraction sections 11 and 12 of a serum sample based on a volume ratio between Sepharose CL-6B and Sephacryl 200-HR.
Figure 10:
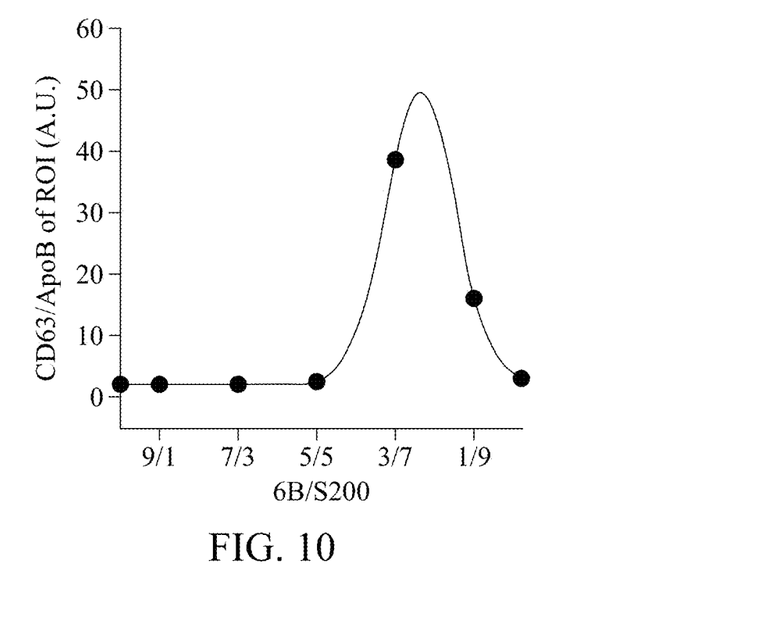
FIG. 10 illustrates CD63 density (%)/ApoB density (%) detected in a fraction sections 11 and 12 of a serum sample based on a volume ratio between Sepharose CL-6B and Sephacryl 200-HR.

Referring to FIGS. 8 and 9, it may be found that a greatest difference between CD63 density (%) and ApoB density (%) is shown when a volume ratio between the Sepharose CL-6B and Sephacryl 200-HR is 3:7 in the regions of interest (ROIs) that are the sections 11 and 12. Referring to FIG. 10, it may be confirmed that a value of CD63 density (%)/ApoB density (%) shows a tendency of a quadratic function that the value of CD63 density (%)/ApoB density (%) increases in a volume ratio of 5:5 to 1:9.

While the example embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits are combined or coupled in different forms and modes than as described above or be substituted or switched with other components or equivalents.

Thus, other implementations, alternative embodiments and equivalents to the claimed subject matter are construed as being within the appended claims.

The invention claimed is:

1. A multi-column for isolating exosomes, the multi-column comprising:
    porous beads (a) having a pore size ranging from 20 nanometers (nm) to 100 nm;
    porous beads (b) having a pore size of 20 nm or less; and
    a separation membrane disposed between the porous beads (a) and (b),
    wherein the porous beads (a) are disposed at a lower portion through which an eluent of a sample is discharged, and are configured to separate exosomes and lipoproteins from a biological sample;
    wherein the porous beads (b) are disposed at an upper portion into which the sample is introduced, and are configured to separate exosomes and water-soluble proteins from the biological sample; and
    wherein the separation membrane is made of a resin interposed between the porous beads (a) and the porous beads (b) so as to prevent mixing of the porous beads (a) and the porous beads (b).

2. The multi-column of claim 1, wherein a volume ratio between the porous beads (a) and (b) is in a range of 95:5 to 5:95.

3. The multi-column of claim 2, wherein the volume ratio between the porous beads (a) and (b) is in a range of 5:5 to 1:9.

4. The multi-column of claim 3, wherein the volume ratio between the porous beads (a) and (b) is in a range of 3:7 to 1:9.

5. The multi-column of claim 1, wherein a surface of each of the porous beads (a) has a higher negative charge value than that of a surface of each of the porous beads (b).

6. The multi-column of claim 1, wherein the porous bead is formed of at least one material selected from agarose, sepharose, cellulose, silica gel, dextran, N,N'-methylene bisacrylamide, methacryl, polyacrylamide, and polystyrene.

7. The multi-column of claim 1, wherein the biological sample is at least one selected from the group consisting of blood, a lymph fluid, a cerebrospinal fluid, urine, an amniotic fluid, breast milk, saliva, semen, and a cell culture fluid.

* * * * *